US007298903B2

(12) United States Patent
Wang et al.

(10) Patent No.: US 7,298,903 B2
(45) Date of Patent: Nov. 20, 2007

(54) METHOD AND SYSTEM FOR SEPARATING TEXT AND DRAWINGS IN DIGITAL INK

(75) Inventors: Jian Wang, Bejing (CN); Haibin Ling, Beijing (CN); Siwei Lyu, Beijing (CN); Yu Zou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 237 days.

(21) Appl. No.: 09/895,429

(22) Filed: Jun. 28, 2001

(65) Prior Publication Data
US 2003/0007683 A1    Jan. 9, 2003

(51) Int. Cl.
*G06K 9/18* (2006.01)
*G06K 9/00* (2006.01)

(52) U.S. Cl. ...................... 382/186; 382/187
(58) Field of Classification Search ............... 382/159, 382/179, 182–183, 185–186, 198, 200, 202, 382/225, 229, 187; 345/858; 715/514
See application file for complete search history.

(56) References Cited

U.S. PATENT DOCUMENTS

| | | | |
|---|---|---|---|
| 4,916,608 A | | 4/1990 | Shultz |
| 5,517,578 A | * | 5/1996 | Altman et al. ............... 382/181 |
| 5,687,254 A | * | 11/1997 | Poon et al. .................. 382/229 |
| 5,757,962 A | * | 5/1998 | Gallo et al. .................. 382/204 |
| 5,889,523 A | * | 3/1999 | Wilcox et al. ............... 345/854 |
| 6,084,985 A | * | 7/2000 | Dolfing et al. ............... 382/187 |
| 6,161,130 A | | 12/2000 | Horvitz et al. |
| 6,192,360 B1 | | 2/2001 | Dumais et al. |
| 6,253,169 B1 | | 6/2001 | Apte et al. |
| 6,304,674 B1 | * | 10/2001 | Cass et al. ................... 382/224 |
| 6,565,611 B1 | * | 5/2003 | Wilcox et al. ............... 715/541 |
| 2002/0064308 A1 | * | 5/2002 | Altman et al. ............... 382/187 |

OTHER PUBLICATIONS

Burges, C. "A Tutorial on Support Vector Machines for Pattern Recognition" ® 1998 Kluwer Academic Publishers, Boston. Data Mining and Knowledge Discovery, 2, 121-167.*
Poon, et al. "Scribbler: A Tool for Searching Digital Ink" [online] ® 1995 ACM [retrieved Jul. 16, 2004]. Retrieved from <http://www.acm.org/sigchi/chi95/Electronic/documnts/shortppr/adp_bdy.htm>.*
Joachims, T. "Text Categorization with Support Vector Machines: Learning wtih Many Relevant Features". 1998, Proceedings the European Conference on Machine Learning, pp. 137-142.*

(Continued)

*Primary Examiner*—Colin LaRose

(57) ABSTRACT

A system for separating text and drawings in a digital ink file (e.g., a handwritten digital ink file). A stroke analyzer classifies single strokes that have been input by a user as "text" or "unknown." The stroke analyzer utilizes a trainable classifier, such as a support vector machine. A grouping component is provided that groups text strokes in an attempt to form text objects (e.g., words, characters, or letters). The grouping component also groups unknown strokes in an attempt to form objects (e.g., shapes, drawings, or even text). A trainable classifier, such as a support vector machine, evaluates the grouped strokes to determine if they are objects.

14 Claims, 14 Drawing Sheets

OTHER PUBLICATIONS

Lopresti, et al. "On the Searchability of Electronic Ink", Proceedings of the Fourth International Workshop on Frontiers of Handwriting Recognition, Dec. 1994, Taipei, Taiwan, pp. 156-165.*

Lopresti, et al. "Algorithms for Matching Hand-Drawn Sketches". Proceedings of the Fifth International Workshop on Frontiers Handwriting Recognition, Sep. 1996, Colchester, England, pp. 233-238.*

Lopresti, Daniel. "Ink As Multimedia Data". Proceedings of the Fourth International Conference on Information, Systems, Analysis and Synthesis, Jul. 1998, Orlando, FL, pp. 122-128.*

Aref, et al. "On the Handling of Electronic Ink". ACM Computing Surveys, vol. 27, No. 4, Dec. 1995, pp. 564-567.*

* cited by examiner

METHOD AND SYSTEM FOR SEPARATING TEXT AND DRAWINGS IN DIGITAL INK

FIELD OF THE INVENTION

The invention relates generally to computers, and more particularly to digital ink files.

BACKGROUND OF THE INVENTION

Digital ink technology enables a user to write and draw on the touch-sensitive screen of a handheld PC or other writing tablet with a stylus or other pointing device, providing a convenient means for applications to accept input from a user without using a keyboard. For a user, taking notes or drawing sketches with using digital ink technology is very much like writing or drawing on paper.

Often, a single handwriting sample that is input via digital ink technology includes both text and drawings. The drawings may be intermixed among the text, and may even encircle the text. Although displaying a text/drawing digital ink file is not that difficult, often a user desires to have the text recognized by the computer receiving the digital ink file. Recognizing the text may be difficult, however, because the digital ink technology may not be able to distinguish the drawings from the text.

To address this problem, many handwriting recognition technologies assume that handwriting input by a user is text. Although this solution works well when the handwriting input actually is text, if a digital ink file does include both text and drawings, the assumption is not correct, and the accuracy and rate of the recognition decreases.

SUMMARY OF THE INVENTION

The present invention provides a method and system for separating text and drawings in a digital ink file (e.g., a handwritten digital ink file). To this end, the present invention provides a stroke analyzer that classifies single strokes that have been input by a user as "text" or "unknown." In accordance with another aspect of the present invention, a grouping component is provided that attempts to group strokes so as to form text objects (e.g., words, characters, or letters). The text objects may then be recognized or otherwise processed with more efficiency.

To perform the stroke analysis, in accordance with one aspect of the present invention, a model for curvature features for single strokes is trained using a trainable classifier, such as a support vector machine (SVM). The curvature features are represented by a curvature vector. The curvature vector may include information obtained, for example, by a tangent histogram or discrete curvature calculation of a stroke. Using the trainable classifier, a single stroke may be classified in accordance with the stroke's curvature vector as either "text" or "unknown."

In accordance with another aspect of the present invention, after the strokes have been classified as text or unknown, strokes are grouped on a spatial basis. The spatial grouping may be based upon how close single strokes were made relative to one another, a time stamp basis (e.g., the proximity of time of creation of the stroke to the time of creation of other strokes), a combination of these, or based on other criteria.

After strokes are grouped, a determination is made whether the grouped text strokes are a text object (e.g., a word or letter). In accordance with one aspect of the present this determination may be made, for example, by evaluating the context each of the strokes in the group relative to other strokes in the group (i.e., locally). The local evaluation of the strokes may result in elimination of some of the strokes in a stroke group that have features that suggest the strokes are not text strokes.

The grouped strokes may also be analyzed contextually on a global basis. The global contextual analysis involves evaluating the strokes in the group against the strokes in the digital ink file, including those outside the stroke group. This evaluation aids in determining if one or more strokes are to be eliminated from and/or added to the text group.

Grouped unknown strokes are evaluated via a grouped stroke classification component. In one embodiment, the grouped stroke classification component is a trainable classifier, such as a neural network, a Bayesian network, or a support vector machine that is trained to classify grouped strokes as text or unknown based upon features of the grouped strokes. The grouped stroke classification component may utilize an energy spectrum vector generated for the grouped unknown strokes by a Harr wavelet transform to classify grouped unknown strokes.

The ink separation and grouping methods of the present invention result efficient separation of text and drawings in a digital ink file. Separation permits increased recognition of text, permitting more efficient processing of a digital ink file.

Other advantages will become apparent from the following detailed description when taken in conjunction with the drawings, in which:

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well known features may be omitted or simplified in order not to obscure the present invention.

Exemlary Operating Environment

Figure 1:
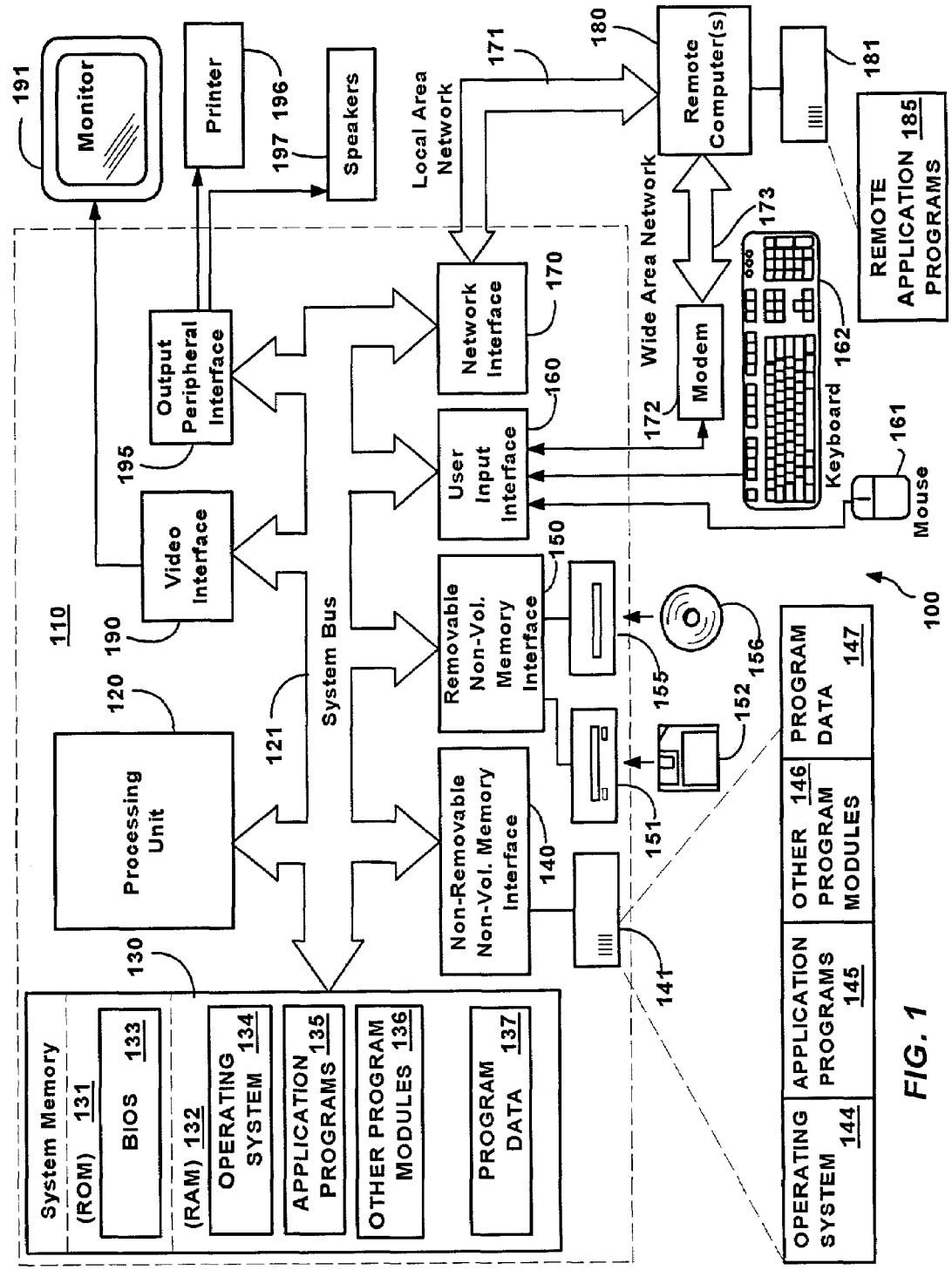
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of an handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

System for Separating Text and Drawings in Digital Ink

Typically, a user generates digital ink information by writing on a touch-sensitive screen or tablet with a stylus or other writing instrument. Other methods may be used to generate digital ink information, such as mouse or other pointer movements, or ink traces of existing documents. The digital ink file generated by a digital ink generator may include information about the user's writing movements, along with enhanced information such as calculated vector information, pressure, timing, strokes, angle of stylus, italic and bold states, and the like. There are a variety of different digital ink formats, and the additional information that the format can store or process with the ink trace varies for the different applications.

In general, the most basic element of digital ink is a stroke. Each drawing, character, word, letter, or shape is typically input as a stroke, a series of strokes, or a portion of a stroke. When a touch sensitive screen is utilized, the stroke is the information generated between a pen down event and a pen up event. If a mouse or other pointer object is used, then the stroke is information that is generated without separation, such a continuous line, a swipe, or a mark. In either event, the stroke may be as short as a dot for an "I," or may be as long as a flowing line with several curves, such as made when writing cursive English. One or more strokes may be used to form a letter or a character, or a single stroke may be used to form several letters or characters. As an example of the latter, a single English cursive stroke may represent several letters.

The present invention is directed to a system and method for separating text and drawings in a digital ink file. Briefly described, the present invention classifies single strokes that have been input by a user as "text" or "unknown." In accordance with one aspect of the present invention, a grouping component is provided that attempts to group text strokes so as to form text objects (e.g., words, characters, or letters). The grouping component also attempts to group unknown strokes to form objects (e.g., shapes, drawings, or even text).

Figure 2:
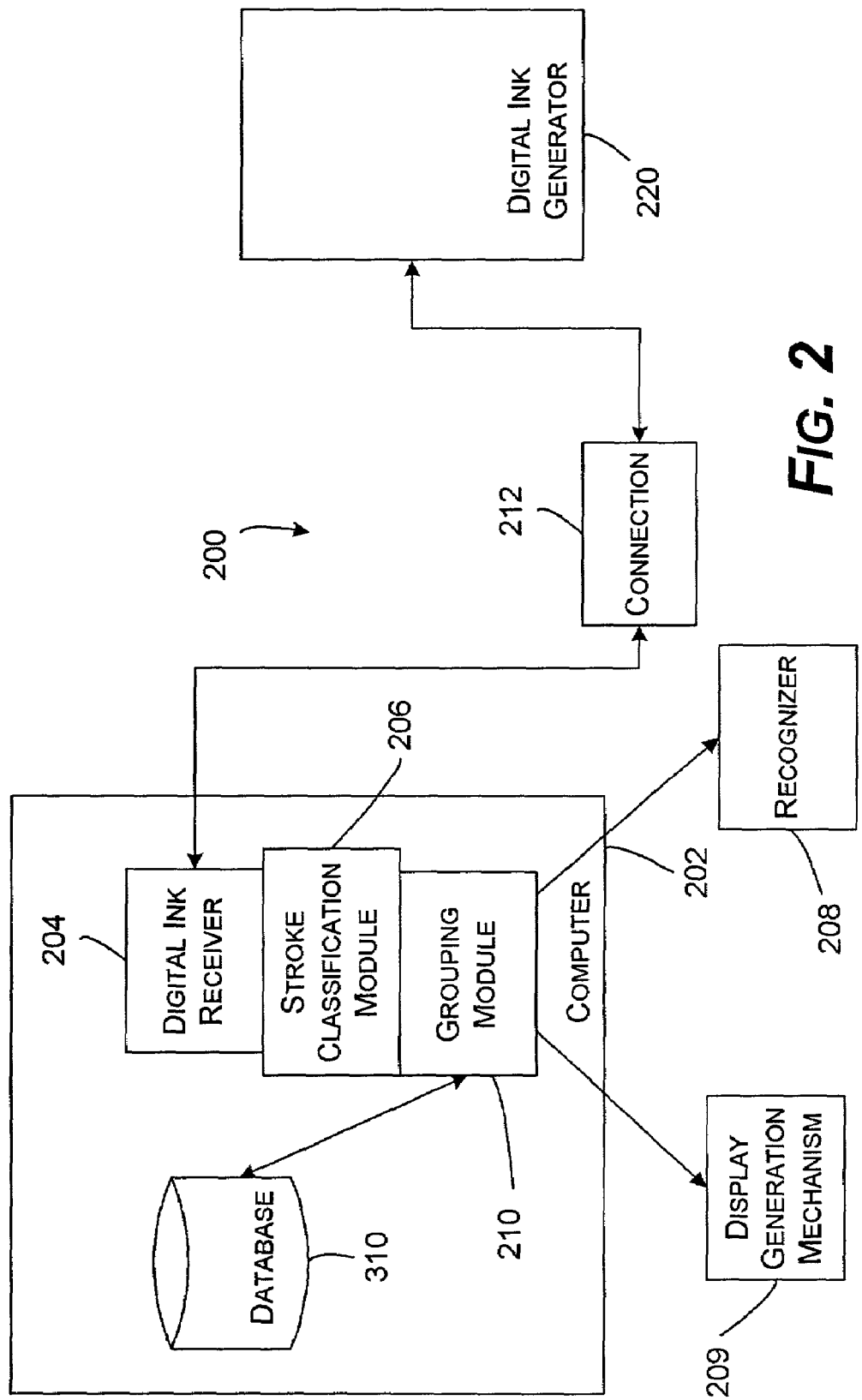
FIG. 2 shows generally an architecture for a system for separating text and drawings of a digital ink file in accordance with one aspect of the invention.

Turning now to the drawings, FIG. 2 shows generally an architecture for a system 200 for separating text and drawings of a digital ink file in accordance with one aspect of the invention. The system 200 includes a computer 202 (e.g., the computer 110) having a digital ink receiver 204. The digital ink receiver 204 receives raw data generated by a user's writing movements, processes that data if necessary, and forwards corresponding digital ink data to appropriate software, such as an operating system or an application. In this manner, the digital ink receiver 204 enables a user to input information into a computer utilizing a digital ink generator such as a writing tablet, and without having to use a keyboard.

In accordance with one aspect of the present invention, the digital ink receiver 204 includes, or alternatively is associated with, a stroke classification module 206, which is configured to separate known text strokes from other strokes of a digital ink file, as is further described below. The digital ink receiver 204 and the stroke classification module 206 may be provided on a single PC (e.g., the personal computer 202), or the stroke classification module 206 may be provided on a separate machine from the digital ink receiver 204. In addition, their various functions may be performed by a single device or by several devices.

In accordance with one aspect of the present invention, and as further described below, a grouping module 210 may be provided for grouping text strokes or unknown strokes, and for determining whether the grouped strokes are objects, such as words, characters, letters, shapes, or drawings. The grouping module 210 is included in, or otherwise is associated with, the stroke classification module 206. The grouping and stroke classification modules 210, 206 may be provided on a single PC (e.g., the personal computer 202), or the stroke classification module 206 may be provided on a separate machine from the grouping module 210. In addition, their various functions may be performed by a single device or by several devices located on the same machine or distributed over various machines.

The grouping module 210 may be connected to a recognizer 208 and/or a display generation mechanism 209, each of which may be integrated with, or separate from, the computer 202. One or both of these components, or other software including the operating system for the computer 202, may utilize the output of the grouping module 210.

The computer 202 is connected via a connection 212 to a digital ink generator 220, which is a mechanism that generates digital ink, e.g., as a result of writing movements by a user. The digital ink generator 220 may be, for example, a writing tablet that receives writing input via a stylus, or a pen that incorporates components (e.g., an accelerometer) that generate digital ink information as a result of writing movements by a user. As another example, digital ink may be generated as a result of curve tracing of a digital image. However, the present invention has particular relevance to digital ink files in which the digital ink file generated by the digital ink generator 220 includes information about the strokes that were input to create the file.

The digital ink data is transmitted to the computer 202 via the connection 212. The connection 212 may be hardwired or wireless (wherein if wireless, the connection is conceptual, e.g., line-of-sight for infrared, or within range for FM transmissions, and so forth). As some examples, the computer 202 may be located remotely from the digital ink generator 220, and transmission of digital ink from the digital ink generator 220 to the computer may occur via a wireless transmission, a local area network (e.g., the LAN 171), a wide area network (e.g., the WAN 173), the Internet, or through another network or similar connection. Alternatively, digital ink information may be stored in memory in the digital ink generator 220, and may be later downloaded to the computer 202. In addition, some or all of the functions of the digital ink receiver 204, the stroke classification module 206, and the grouping module 210 may be integrated with the digital ink generator 220, although in practice, such a design may result in a mechanism that may be too cumbersome for comfortable digital ink input.

Figure 3:
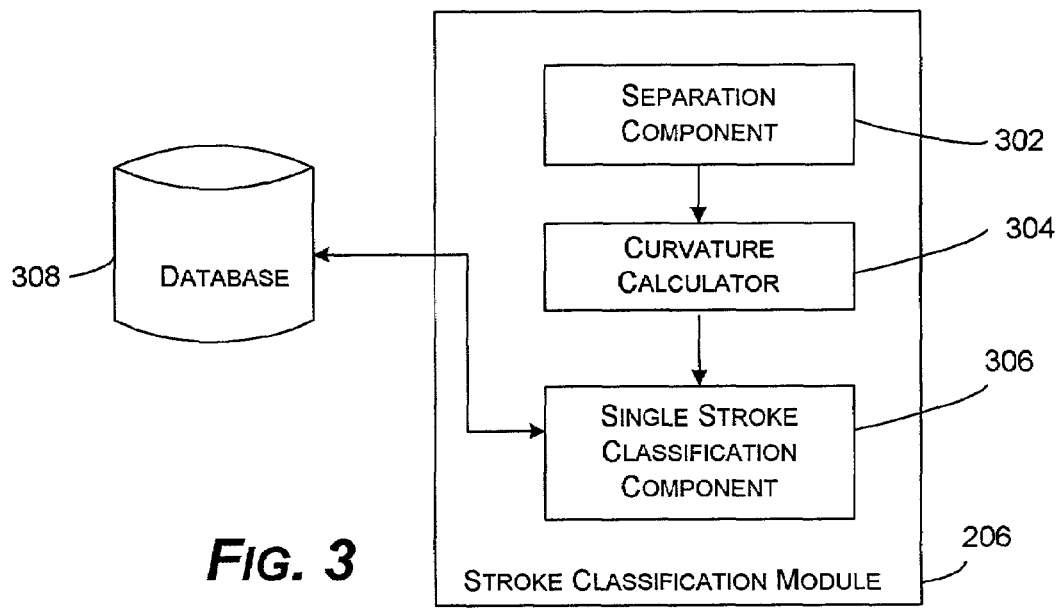
FIG. 3 shows a block diagram representing an architecture of a stroke classification module in accordance with an aspect of the invention.

FIG. 3 shows a block diagram representing an architecture of the stroke classification module 206 in accordance with an aspect of the invention. The stroke classification module 206 includes a separation component 302, a curvature calculator 304, and a single stroke classification component 308. The stroke classification module 206 includes, or otherwise is associated with, one or more databases 308 (only one is shown in the figures). The function and operation of each of these components is described below.

Building the Single Stroke Classification Component

In accordance with one aspect of the present invention, the single stroke classification component 308 is a trainable classifier that is configured to learn information about stroke curvature based upon a large data set of strokes. The trainable classifier may be, for example, a neural network, a Bayesian network, or a support vector machine, but is preferably a support vector machine. Although each of these trainable classifiers is known in the art, the theory and operation of a support vector machine is described for the reader's convenience.

An object to be classified may be represented by a number of features, referred to as a "feature vector." If, for example, the object to be classified is represented by two (2) features, it may be represented by a point in two (2) dimensional space. Similarly, if an object to be classified is represented by n features, it may be represented by a point in n-dimensional space. The simplest form of an support vector machine defines a plane in the n-dimensional space (also referred to as a "hyperplane") that separates feature vector points associated with objects "in a class" and feature vector points associated with objects "not in the class." A number of classes may be defined by defining a number of hyperplanes. The hyperplane defined by a trained support vector machine maximizes a distance (also referred to as an Euclidean distance) from it to the closest points (also referred to as "support vectors") "in the class" and "not in the class." A hyperplane is sought which maximizes the distances between the support vectors and the hyperplane, so that the support vector machine defined by the hyperplane is robust to input noise. The hyperplane (or hypersurface) is defined by a training process.

Figure 4:
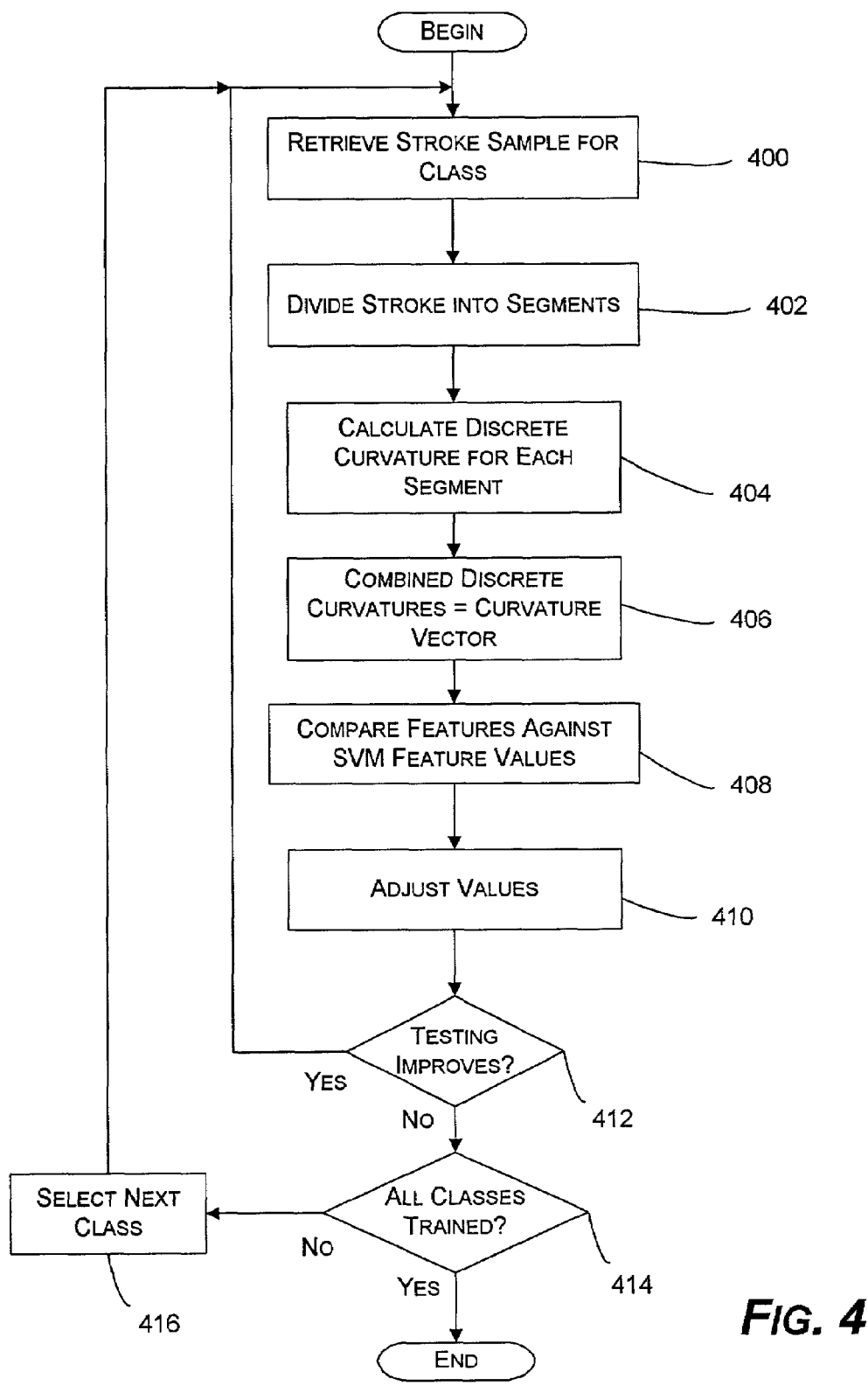
FIG. 4 shows a general overview of a process for training a trainable classifier to recognize curvature features of strokes in accordance with one aspect of the present invention.

In accordance with one aspect of the present invention, a trainable classifier is trained to define hyperplanes for curvature features of known stroke values. To this end, FIG. 4 shows a general overview of a process for training the trainable classifier to recognize the curvature features of strokes in accordance with one aspect of the present invention. For ease of reference, the trainable classifier is referred to hereinafter as a support vector machine, although other trainable classifiers may be used. In this example, the objects that are to be in a class are strokes that fall within a margin of error of meeting the curvature features of a trained stroke, The different curvature features are defined by a "curvature vector," which may include such information as a tangent histogram of a stroke, or information regarding the discrete curvature of a stroke, as further described below.

Beginning at step 400, the support vector machine retrieves a known stroke sample for a given class. The sample may be, for example, a known stroke element for a letter, or a stroke that represents an English cursive word. The stroke sample may be one of hundreds that have been generated by separate individuals.

Information about the curvature of the stroke is then generated. The information represents the curvature vector that is supplied to the support vector machine, as further described below. In this example, discrete curvature of a number of points along the curve is calculated, and the combined curvature is used as the curvature vector. Other methods may be used, as is described below.

In any event, in this example, at step 402, the stroke is divided into a plurality of segments. The number of segments may be set as desired, but in one implementation of the invention is 64 segments. The segments are preferably of equal length.

Figure 5:
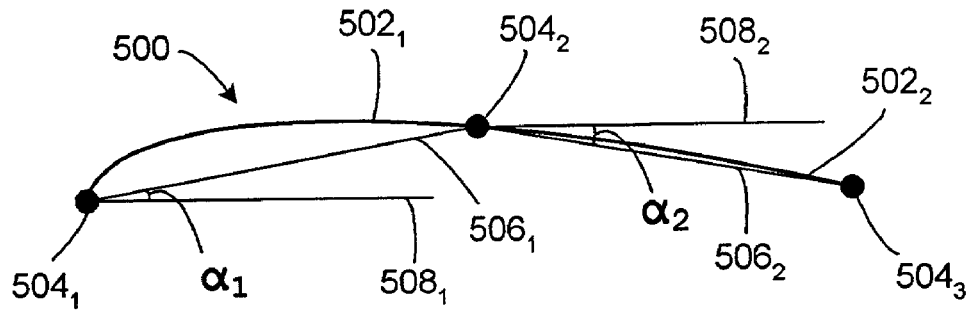
FIG. 5 is a representation of an ink trace showing how discrete curvature may be calculated in accordance with one aspect of the present invention.

Using the stroke's segments, the discrete curvature of the points between segments is calculated at step 404 (e.g., by the curvature calculator 304). An example of how the discrete curvature may be calculated is shown in FIG. 5. The original ink curve 500 in the example has been separated into a number of segments $502_1$, $502_2$ (only two of the segments are shown in FIG. 5 for ease of example, but the number is preferably 64, as described above). Points $504_1$, $504_2$, and $504_3$ are defined at the junctures of the segments.

Having the points $504_1$, $504_2$, $504_3$, angles $\alpha_1$, $\alpha_2$ are defined between lines $506_1$, $506_2$ extending between the points and a reference line, in this case horizontal reference lines $508_1$, $508_2$. The discrete curvature of a point $504_N$ along the line is then defined by the difference between the angle $\alpha_{N-1}$ at the previous point $504_{N-1}$ and the angle $\alpha_N$ at the point $504_N$:

Curvature (Point $N$)=$\alpha_{N-1}$-$\alpha_N$

The angle $\alpha_N$ may be calculated using geometry:

$\alpha_N$=arctan $((X_{N+1}-X_N)/(Y_{N+1}-Y_N))$ where $X_{N+1}$ is the X coordinate for the point $504_{N+1}$, $X_N$ is the X coordinate for the point $504_N$, $Y_{N+1}$ is the Y coordinate for the point $504_{N+1}$, and $Y_N$ is the Y coordinate for the point $504_N$.

Having the curvature for all points 504 along the line, the curvature vector for the series of curvatures is set as the curvature vector for the stroke at step 406.

Figure 6:
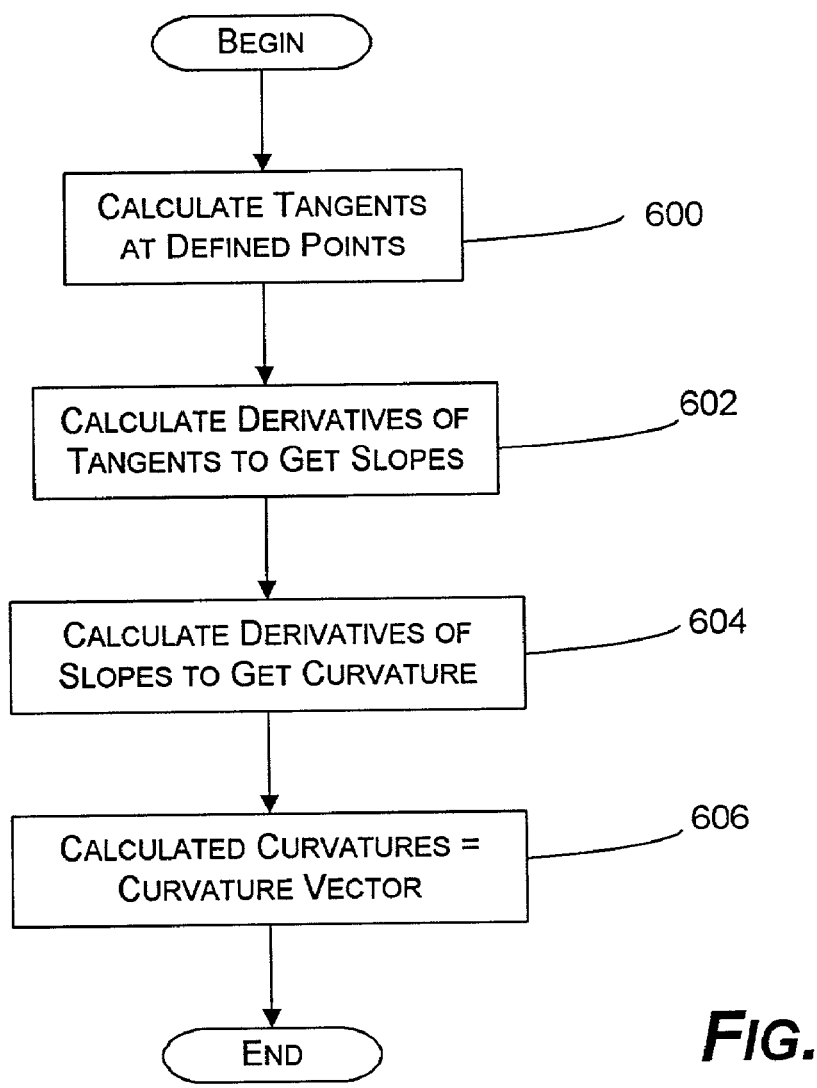
FIG. 6 shows a general overview of a process for calculating a tangent histogram of an ink trace in accordance with an aspect of the present invention.

The curvature vector may be calculated in other ways. As an example, as generally shown in FIG. 6, a tangent histogram for a stroke may be generated. The tangent histogram represents a series of the second derivatives of the tangents of the curve. To generate the tangent histogram, beginning at step 600, a defined number of tangents are calculated at spaced distances along the curve. The number of tangents may be limited to tangents drawn at a number of equally spaced points along the curve, e.g., 64, or tangents may be drawn at any interval along the curve. Setting a limited number of tangents to be calculated limits the processing that must be conducted by the computer 202.

At step 602, the derivatives (e.g., slopes) of the tangents are plotted, to form a representation of the angles of the curve relative to a reference line (e.g., horizontal). At step 604, the derivative of the angle curve is calculated, which represents the curvature of the curve. It can be understood that the second derivative of the tangent information may be calculated directly from the tangent information, avoiding the intermediate step of generating the angle curve. The second derivative information along the stroke, representing the tangent of the stroke, may then be used as the curvature vector for the stroke at step 606.

The tangent histogram may be used to generate a more accurate representation of the curvature of the stroke. The discrete curvature calculations above, on the other hand, are roughly equivalent to the curvature of the stroke, but not quite as accurate. However, the discrete curvatures are more easily calculated, saving processing time and speeding the support vector machine learning process.

In any event, returning to FIG. 4, at step 408, the features of the curvature vector are compared by the support vector machine against possible curvature features for strokes. This information is used to train the support vector machine to generate a trained curvature vector for the present class of strokes.

The process for training support vector machines in known, but a brief description is given here to aid the reader. First, the support vector machine is initialized and trained on known inputs (in this example, strokes) having known output values, or classifications. For example, a given text stroke value, if English, may be a letter, a series of letters, or a portion of a letter. A number of features are defined for a given curvature vector which may or may not be present within a particular class. The support vector machine may be initialized by setting the weights and biases of the processing features (e.g., values for the series of discrete curvatures) to random values, typically generated from a Gaussian distribution. The support vector machine is then trained using a succession of inputs (in this example, the curvature vectors of strokes) having known outputs or classes. As the training inputs are fed to the support vector machine, the values of the weights and biases for particular features are adjusted (e.g., in accordance with a known back-propagation technique) such that the output of the support vector machine of each individual training pattern approaches or matches the known output (step 410). Basically, a gradient descent in weight space is used to minimize the output error. In this manner, learning using successive training inputs converges towards a locally optimal solution for the weights and biases. That is, the weights and biases are adjusted to minimize an error.

In practice, the system is not trained to the point where it converges to an optimal solution. Otherwise, the system would be "over trained" such that it would be too specialized to the training data and might not be good at classifying inputs which differ, in some way, from those in the training set. Thus, at various times during its training, the system is tested on a set of validation data. Training is halted when the system's performance on the validation set no longer improves.

At step 412, a determination is made if the system's performance on the validation set no longer improves. If not, the process loops back to step 400, where the next stroke for the class is obtained. If so, the process for that stroke ends, and a determination is made at step 414 whether all classes have been trained. If not, the next class of stroke begins training at step 416. If so, the process ends.

After all stroke classes have been trained, the support vector machine is ready for use with the invention. It can be understood that the number of classes may be large, and thus training the support vector machine may be a time-consuming and expensive process, requiring thousands of stroke samples from hundreds of individuals. However, once trained, the support vector machine of the present invention may be duplicated and used in the single stroke classification component 308 for multiple applications.

Classifying Strokes

Figure 7:
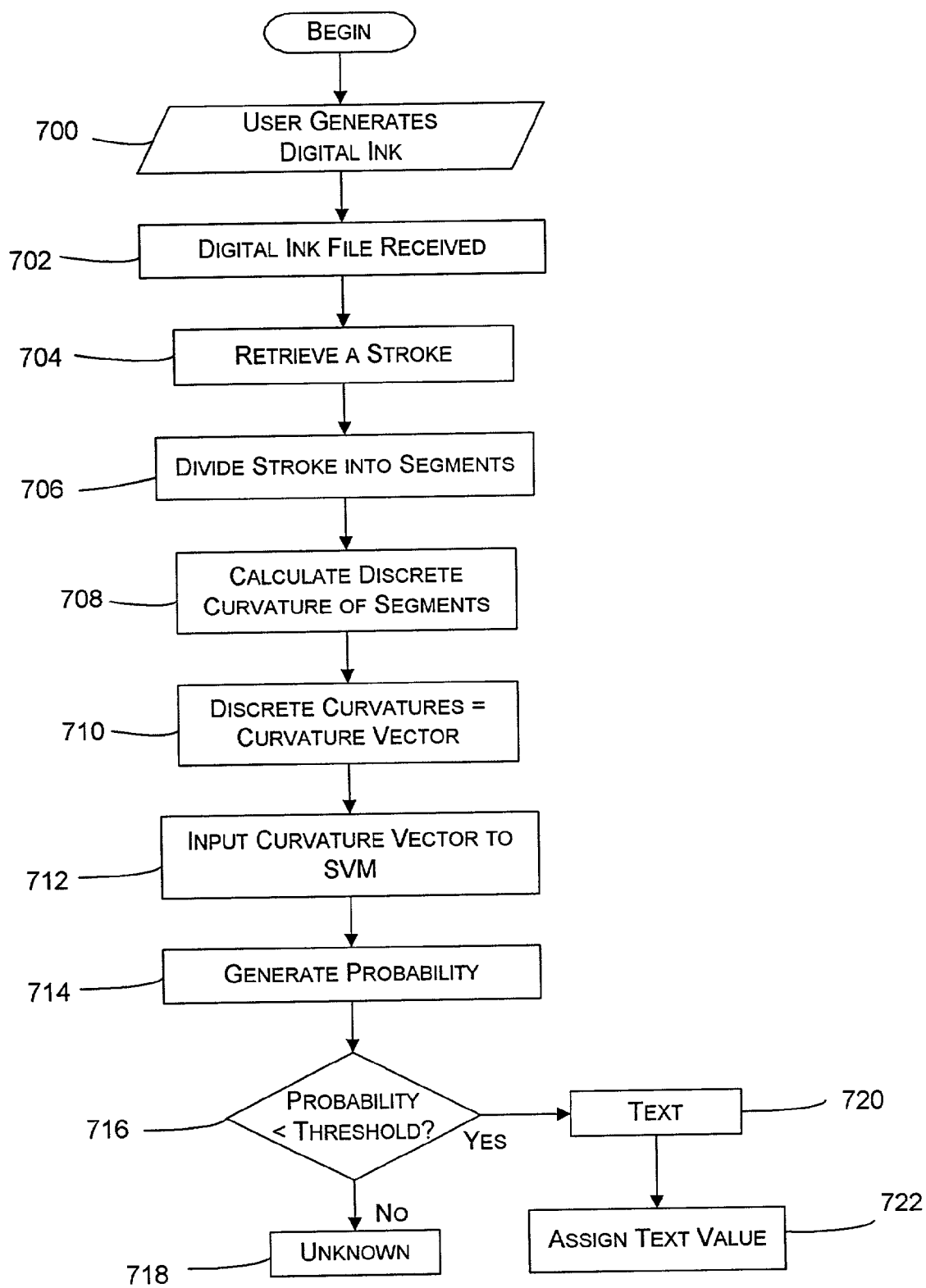
FIG. 7 shows a general overview of a process for classifying strokes of a digital ink file as "text" or "unknown" in accordance with one aspect of the present invention.
Figure 8:
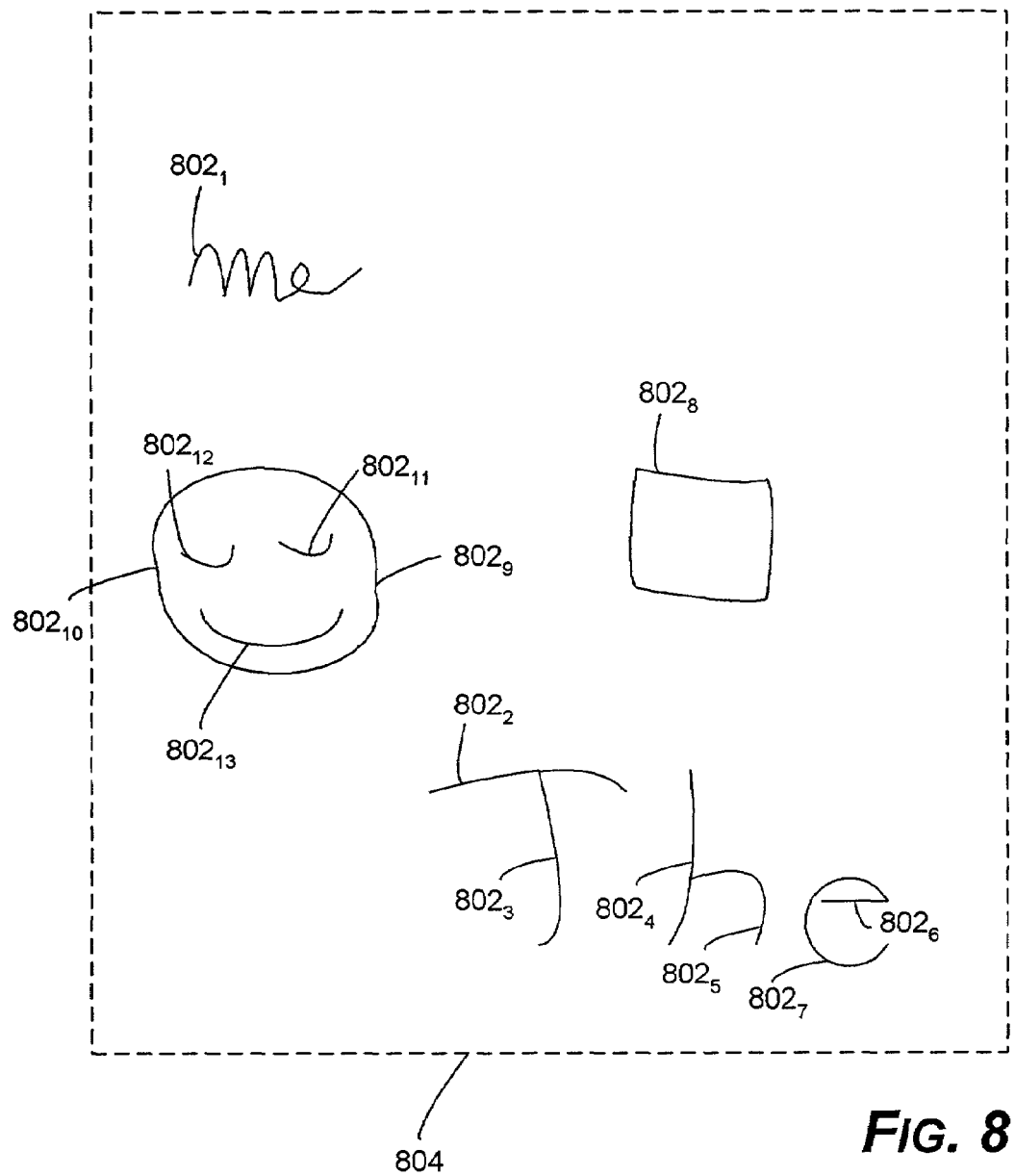
FIG. 8 is a representation of a digital ink document.

In accordance with one aspect of the present invention, after trained, the stroke classification module 206 may be used to separate known text strokes from other strokes. FIG. 7 shows a general overview of a process for classifying strokes of a digital ink file as "text" or "unknown" (e.g., via the stroke classification module 206) in accordance with one aspect of the present invention. Beginning at step 700, a user generates digital ink using the digital ink generator 220. In general, as can be seen in FIG. 8, the original digital ink data may include a series of strokes 802 made by a user that represent a document 804 drawn by the user. FIG. 8 is a simplistic example, but gives some examples of some types of strokes that may be included in a document or digital ink file. For example, some of the strokes may, by themselves, represent text (e.g., the single stroke $802_1$ is a continual stroke that represents the word "me"). Some strokes may be combined with other strokes to create text (e.g., the strokes $802_2$-$802_7$ represent the word "the"). Still other strokes may represent shapes or drawings (e.g., strokes $802_8$-$620_{12}$). Some of the drawing strokes may represent a shape by themselves (e.g., stroke $802_8$ is a square drawn by a single stroke). Other drawings strokes may combine with other strokes to form a shape (e.g., strokes $802_9$-$602_{10}$ are two line segments that generally represent a circle). If a touch-sensitive screen is utilized, additional digital ink information, such as calculated vector information, pressure, timing, strokes, angle of stylus, and the like, may be generated by the touch-sensitive screen or tablet, and may be included in the digital ink file. At step 702, the strokes 802 and additional digital ink information (if available) are transferred to the computer 202 via the connection 212 and are received by the digital ink receiver 204.

At step 704, the separation component 302 retrieves one of the strokes of the digital ink file, and at step 706 the separation component divides the stroke into a plurality of segments. The number of segments may be set as desired, but should be equal to the value used in the training process.

At step 708, the discrete curvature for the stroke's segments is calculated (e.g., by the curvature calculator 304 in the manner described above). Using the series of discrete curvatures, the curvature vector for the stroke is set at step 710.

The contents of the curvature vector are applied as input to the support vector machine (SVM) classifier of the single stroke classification component 308 (step 712). Based on the features that are present in the curvature vector, the support vector machine generates a probabilistic measure as to whether the stroke is one of the trained strokes in the support vector machine or not (step 714). This measure is then compared against a preset threshold value (step 716).

If probabilistic measure for the stroke equals or exceeds the threshold, then step 716 branches to step 718, where the stroke is classified as "unknown." Alternatively, if the probabilistic measure for the stroke is less than the threshold, then step 716 branches to step 720, where the stroke is classified as text, and is assigned the value of the corresponding text stroke in the support vector machine (step 722).

The single stroke classification process described herein results in a number of strokes being classified as text and/or unknown. The classified strokes may then be further analyzed, as described below, or may be maintained in the database 308 for later analysis or use.

Grouping Strokes and Classifying as Objects

In accordance with one aspect of the invention, after strokes have been classified as "text" or "unknown," strokes are grouped, and an analysis is made as to whether to classify the grouped strokes as a text object. The system uses components to analyze the groups, and through analysis, provides stroke groups that are likely text objects. By grouping the strokes into a text object, more efficient recognition, display, or other uses of the handwritten document are available.

Figure 9:
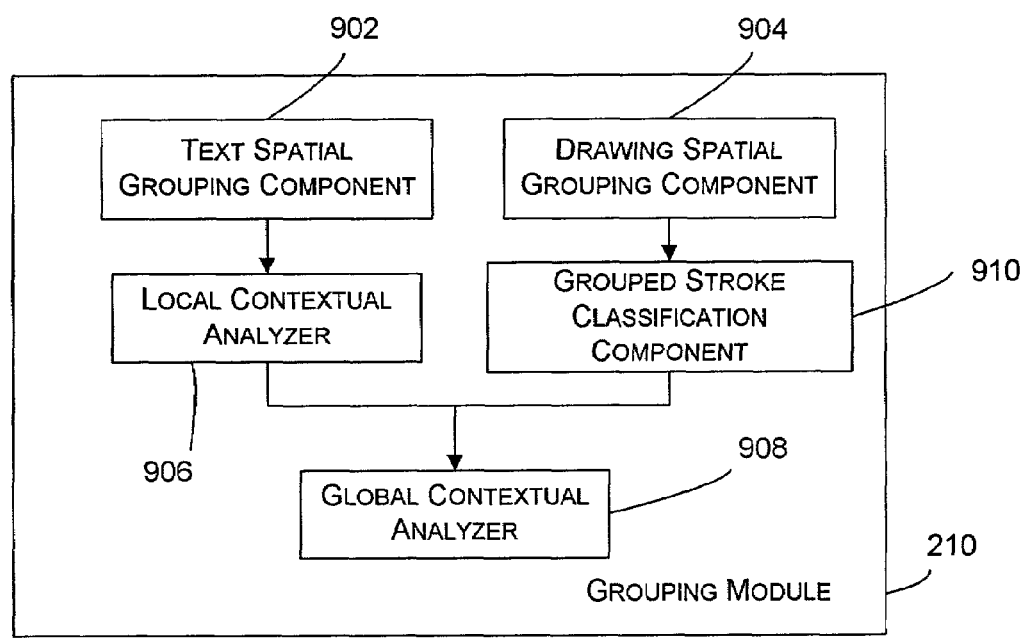
FIG. 9 shows a block diagram representing an architecture of a grouping module in accordance with an aspect of the present invention.

FIG. 9 shows a block diagram representing an architecture of the grouping module 210 in accordance with an aspect of the present invention. The grouping module 210 includes a text spatial grouping component 902, a drawing spatial grouping component 904, a local contextual analyzer 906, a global contextual analyzer 908, and a grouped stroke classification component 910. The function and operation of each of these components is described below.

Figure 10:
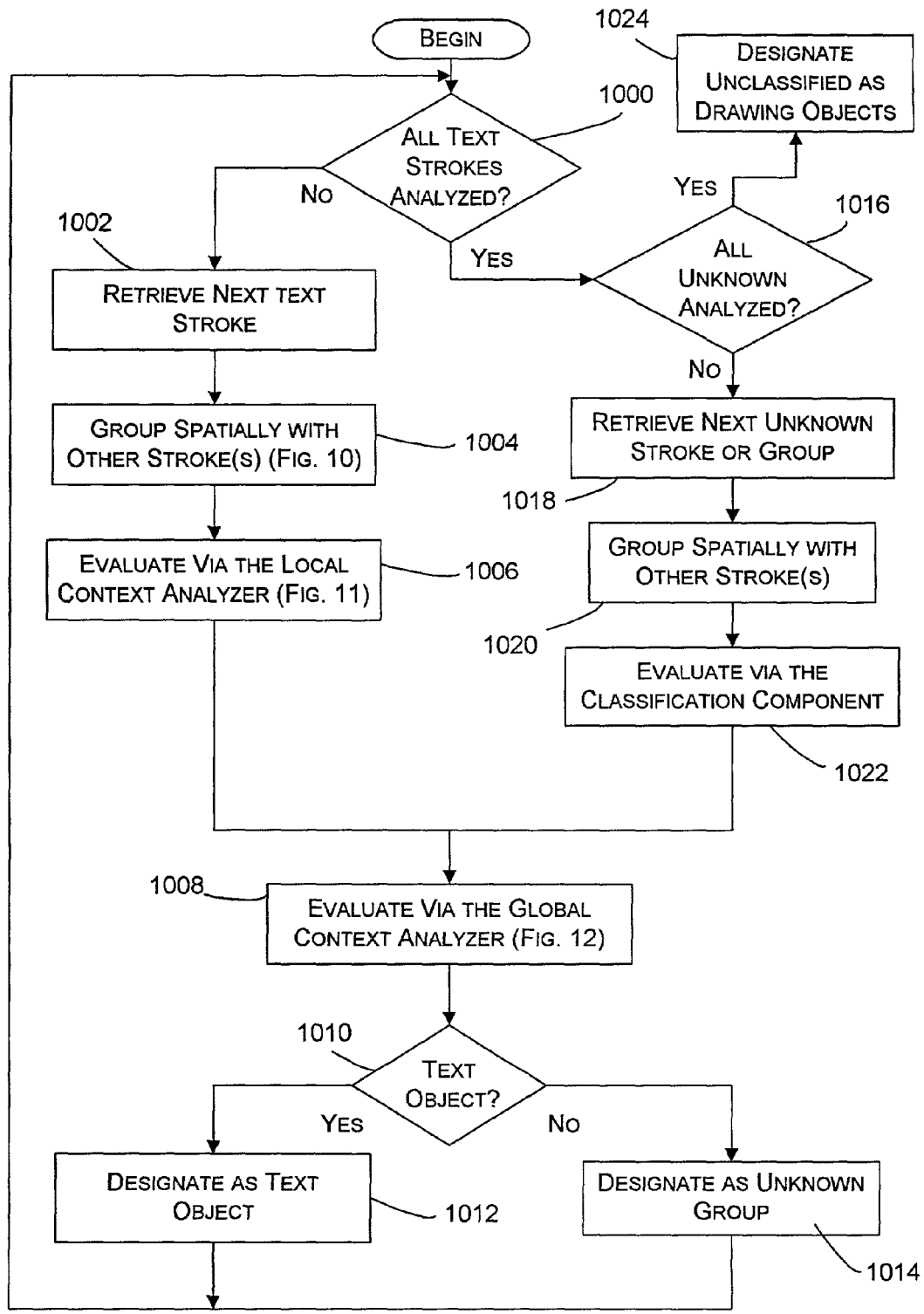
FIG. 10 shows a general overview of a process of grouping strokes and classifying the grouped strokes as text or drawing objects in accordance with one aspect of the present invention.

A general overview of a process of grouping strokes and classifying the grouped strokes as text or drawing objects is shown in FIG. 10. Beginning at step 1000, an evaluation is made whether all text strokes have been analyzed. That is, a determination is made if grouping and grouped classification has been attempted for all text strokes. If not, then step 1000 branches to step 1002, where a text stroke is retrieved. At step 1004, the text stroke is grouped with strokes that are adjacent in sequence and/or distance (e.g., by the text spatial grouping component 902). The strokes that are grouped with the selected text stroke may have been previously classified as "text" or "unknown." In general, in accordance with one aspect of the present invention, adjacent strokes are grouped with a text stroke because there is a probability that the strokes are also text because the strokes are close in sequence and location relative to the text stroke. A process for grouping the strokes spatially is described in connection with FIG. 11, below.

At step 1006, the grouped result is then evaluated contextually on a local basis (e.g., via the local contextual analyzer 906). In general, evaluating the grouped strokes contextually involves eliminating some of the strokes in the stroke groups that have features that suggest the strokes are not text strokes. The strokes are evaluated against adjacent strokes, thus the term "local" is used to describe the evaluation. The process may result in a text group no longer being considered a text group, and changing the status of the text group to "unknown." This process further assures that the strokes in the group represent text. A process for analyzing the context of the strokes locally is generally described in connection with FIG. 12, below.

After being evaluated locally, the grouped strokes, whether classified as text or not, are analyzed contextually on a global basis at step 1008 (e.g., by the global contextual analyzer 908). This process involves evaluating the strokes in the group against the strokes in the digital ink file, including those outside the stroke group. This evaluation aids in determining if one or more strokes are to be eliminated from and/or added to the text group. The process increases the likelihood that each of the strokes is a text stroke in a text group, and to further assures that all relevant strokes are included in the text group. In addition, a group that is not known to be a text group may be grouped with a text group on a global basis, and may thereby be classified as a text object. A process for analyzing the context of the strokes globally is described in connection with FIG. 13, below.

If the grouped strokes are classified as a text object by the global contextual analyzer 908, step 1010 branches to step 1012, where the grouped strokes are labeled as a text object, and the process of grouping and classifying of that set of strokes is complete. The process then loops back to step 1000, where a determination is made whether all text strokes have been analyzed.

If the global contextual analysis does not classify the grouped strokes as text, then step 1010 branches to step 1014, where the grouped strokes are designated as a grouped unknown strokes, which are analyzed later, described below. In either event, the process loops back to step 1000, where a determination is made whether all text strokes have been analyzed.

The process continues until all text strokes have been analyzed. It is possible that the process may be complete after analyzing of all text strokes. For example, the single stroke classification component 308 may have classified all strokes as text. In addition, all unknown strokes may have been grouped with text strokes during one or more operations of the grouping steps 1004, 1006, and/or 1008, and may have been labeled as text objects. However, if unknown strokes and/or groups remain after all the text strokes have been analyzed, step 1000 branches to step 1016, where a determination is made as to whether all unknown strokes or groups have been analyzed. If so, the process ends, as described below. If not, step 1016 branches to step 1018, where an unknown stroke or group is retrieved. At step 1020, the unknown strokes or groups are grouped spatially, if possible, e.g., by the drawing spatial grouping component 904. The process for grouping the unknown strokes spatially is similar to the process for grouping the text strokes spatially, and is described in connection with the description of the grouping of text strokes spatially, generally with FIG. 11, below.

After grouping the unknown strokes or groups spatially, at step 1022, the grouped unknown strokes are evaluated via the grouped stroke classification component 910. The processes of building the grouped stroke classification component 910, and evaluating the grouped strokes via the grouped stroke classification component 910, are described below. In summary, however, the grouped stroke classification component 910 is a trainable classifier, such as a neural network, a Bayesian network, or a support vector machine that is trained to classify grouped strokes as text or unknown based upon features of the grouped strokes. In one example described below, the grouped stroke classification component 910 utilizes an energy spectrum vector generated for the grouped unknown strokes by a Harr wavelet transform to classify grouped unknown strokes.

After being classified by the grouped stroke classification component 910, the grouped strokes are analyzed contextually on a global basis at step 1008 (e.g., by the global contextual analyzer 908) to further classify the grouped strokes so that they might be labeled as a text object. The grouped stroke classification component 910 then may group some strokes with the group, as described below, and determines whether the group of strokes is a text object at step 1010. The process then loops back to step 1016, where a determination is made as to whether all unknown strokes and/or groups have been analyzed.

After all unknown strokes and/or groups have been analyzed, step 1016 branches to step 1024, where the unknown groups that were not classified as text objects are designated as drawing objects. The process is then complete, typically resulting in a number of text objects and a number of drawing objects.

The grouping process described results in a number of grouped text or drawing objects. One or more of the objects may be a single stroke, because the grouping process may not result in grouping of a text or unknown stroke with other strokes. The text or drawing objects may then be processed as desired. For example, text recognition may be performed on the text objects, and the recognized text and drawing objects may be displayed. If desired, the text and drawing objects may be maintained in the database 308, where they may be retrieved and processed later.

Grouping the Strokes Spatially

At step 1004, described above, the text spatial grouping component 902 groups a text stroke with strokes that are spatially related to the text stroke. That is, sequential strokes that are in close proximity to a text stroke may be grouped with the text stroke. In general, in accordance with one aspect of the present invention, adjacent strokes are grouped with a text stroke because there is a probability that the strokes are also text because the strokes are close in sequence and position relative to the text stroke.

The strokes are grouped based upon local characteristics. Thresholds may be set for determining whether a stroke is to be combined with a text stroke spatially. For example, if a stroke is the sequential stroke immediately before or after a text stroke, and is a defined distance from the text stroke, the text spatial grouping component may group the two strokes together. A similar process may be used for grouping unknown strokes, e.g., using the drawing spatial grouping component 904.

Figure 11:
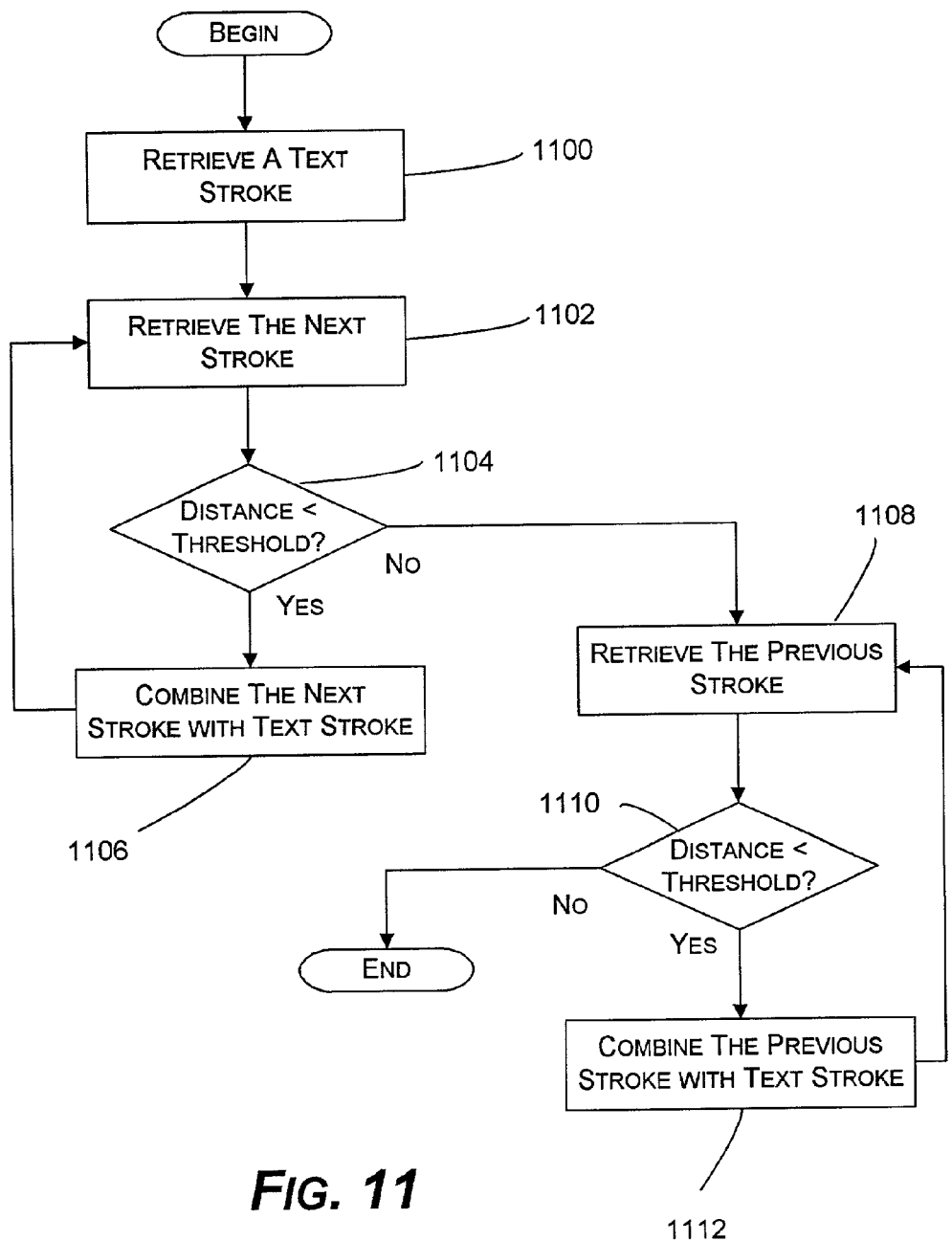
FIG. 11 is a general overview of a process for grouping strokes spatially with a stroke known to be a text stroke in accordance with one aspect of the present invention.

Numerous possibilities are available for combining strokes spatially, however, for ease of explanation, an example of a general overview of a process for grouping strokes spatially with a stroke known to be a text stroke is generally shown in FIG. 11. Beginning at step 1100, a text stroke is retrieved. At step 1102, the next sequential (i.e., after in time) stroke is retrieved. The next sequential stroke may be a text stroke or an unknown stroke. For ease of illustration, this particular stroke is referred to as "stroke 2."

At step 1104, a determination is made whether stroke 2 is within a defined distance, or within a distance threshold, from the text stroke. If so, then step 1104 branches to step 1106, where stroke 2 is combined with the text stroke. The process then loops back to step 1102, where the next sequential stroke is retrieved (for ease of illustration, referred to as "stroke 3"). The process then proceeds through step 1104, where a determination is made whether stroke 3 is within the defined distance from stroke 2, and so forth.

When a sequential stroke is outside the defined distance from the present stroke, then step 1104 branches to step 1108, where the stroke that is immediately previous in sequence to the text stroke is retrieved. For ease of description, this stroke is referred to herein as "stroke (−1)." At step 1110, a determination is made whether stroke (−1) is within the defined distance from the text stroke. If so, then step 1110 branches to step 1112, where stroke (−1) is combined with the text stroke. The process then loops back to step 1108, where the next previous sequential stroke is retrieved (for ease of illustration, referred to as "stroke (−2)"). The process then proceeds through step 1110, where a determination is made whether the stroke (−2) is within the defined distance from the stroke (−1), and so forth. When a previous sequential stroke is outside the defined distance from the present stroke, the grouping process for the text stroke ends.

The distance used as a threshold by the text spatial grouping component 902 may be fixed, such a distance obtained by a statistical analysis of several user's handwriting. Alternatively, the distance may be calculated from the strokes in the particular document, e.g., a maximum distance between known text strokes, or that maximum distance plus an error amount. In one embodiment, average stroke height h0 and standard variance of height of known text strokes d0 are calculated. Strokes that have a height that falls within the range of (h0+d0) and (h0−d0) are averaged to determine an average height h1. The distance threshold is then set at (h1)/2. Other methods of normalization may be used to determine the distance.

The number of grouped strokes in a text group may vary depending upon the layout of the digital ink file. In some digital files, there may be multiple groups of multiple strokes. Using FIG. 8 as an example, if at least one of the strokes 802$_2$-802$_7$ was previously classified as a text stroke, and the strokes are within the defined distance from one another, the text spatial grouping component 902 would group these six strokes together. Similarly, multiple unknown strokes may be grouped by the drawing spatial grouping component 904. Again using FIG. 8 as an example, if none of the strokes 802$_9$-802$_{13}$ was previously classified as a text stroke, and the strokes are within the defined distance from one another, the text spatial grouping component 902 would group these five strokes together.

There may be times when a single text or unknown stroke, because of the defined threshold, may not be grouped with any other strokes. Using the document 804 in FIG. 8 again as an example, the strokes 802$_1$ and 802$_8$, because of their distance to other strokes, may not be grouped with other strokes. Whether the single strokes would be considered a text or unknown group would depend upon the classification of the individual stroke. That is, if the stroke were classified by the single stroke classification component as being text, then the stroke would be classified as a text group.

Analyzing Context Locally

As described above, the local contextual analyzer 906 may evaluate local characteristics of the strokes that are grouped with one or more text strokes to further determine if each of the strokes should remain in the group before the group is classified as a text object. Although there is a good probability that strokes grouped by the text spatial grouping component 902 are text strokes, there are exceptions, and some of these exceptions may occur regularly so that the exceptions may be eliminated using statistical rules. To this end, the local context analyzer 906 utilizes one or more features of strokes and defines a threshold for each of the features, or a combination of the features. Rules are established using the thresholds wherein a stroke that exceeds (or falls under, depending upon the threshold limit) the threshold is not considered to be text. The strokes are evaluated against adjacent strokes, thus the term "local" is used to describe the evaluation. In this manner, the local context analyzer 906 may eliminate one or more strokes in a stroke group that was combined by the text spatial grouping component 902, and the probability that all strokes in the text group are text increases.

The process may result in a text group no longer being considered "text," thus changing the category for the group to "unknown." This feature eliminates some false positives that may have been grouped by the text spatial grouping component 902, such as, for example, where a stroke was initially designated as text, grouped with other, unknown strokes, and then it is determined by the local context analyzer 906 that the stroke initially classified as text is likely not text.

A number of different features may be used to help classify the strokes locally. As one example, some strokes may be eliminated for grouping because of relative height compared to the other strokes in the group. This approach may be used because, for the most part, the range of heights for adjacent characters typically does not alter that much in a user's writing. A rule such as the following may be established to eliminate strokes that are outside a normal variance in height relative to an adjacent stroke:

$$\text{Threshold}_1 > (h_1/h_2) > (1/\text{Threshold}_1)$$

where $\text{Threshold}_1$ is a number that reflects an allowable variance in height between strokes that are adjacent in sequence, $h_1$ is the height of a stroke that in a text group, and $h_2$ is the height of the next adjacent stroke. $\text{Threshold}_1$ may be a defined number for all writers, such as the number 2, or may be derived from the user's known text strokes. As an example of how to derive the number from a particular user's text stokes, a given user's known text strokes may vary no more than a ratio of 2 from the tallest to shortest strokes, and using that number, a variance, which may be 2, or 2 with an error factor (e.g., 2*1.1=2.2) may be used.

An unknown stroke that violates the above height rule against a known text stroke may be eliminated from a text group, and is designated as an unknown stroke. Similarly, a stroke that violates this rule against text strokes that are both before and after the stroke in a text group may be eliminated. This may result in separating the text group into two texts groups, the two text groups consisting of the strokes on opposite sides of the rule-violating stroke. Often, the rule-violating stroke is located at an end of a text group, and may be eliminated using the rule. Using the height rule above, a stoke that appears to be much taller or shorter than the normal range of a user's writing may be eliminated.

As another example of a feature that may be used, some strokes may be eliminated because the aspect ratio of the stroke falls outside a defined range of aspect ratios for strokes. A formula may be defined for the range such as follows:

$$(W_1/h_1) > (w/h) > (w_2/h_2)$$

where $W_1/h_1$ is a high threshold for an aspect ratio, $W_2/h_2$ is a low threshold for an aspect ratio, and $W/h$ is the actual aspect ratio for a stroke. The stroke may be eliminated from a stroke group if it does not fall in this range. $W_1/h_1$ and $W_2/h_2$ may be determined based on the particular user's strokes, or may be determined statistically. As an example, a range for aspect ratios of strokes may be defined by extracting aspect ratios for text strokes formed from several people's handwriting. A margin of error for detecting the text strokes may be defined, and aspect ratios that result in an error percentage exceeding the margin may be considered to be too high. The ratio for a single stroke is very large so that only a very long and thin stroke will reasonably fall outside the range. In this manner, long cursive strokes are not eliminated.

Figure 12:
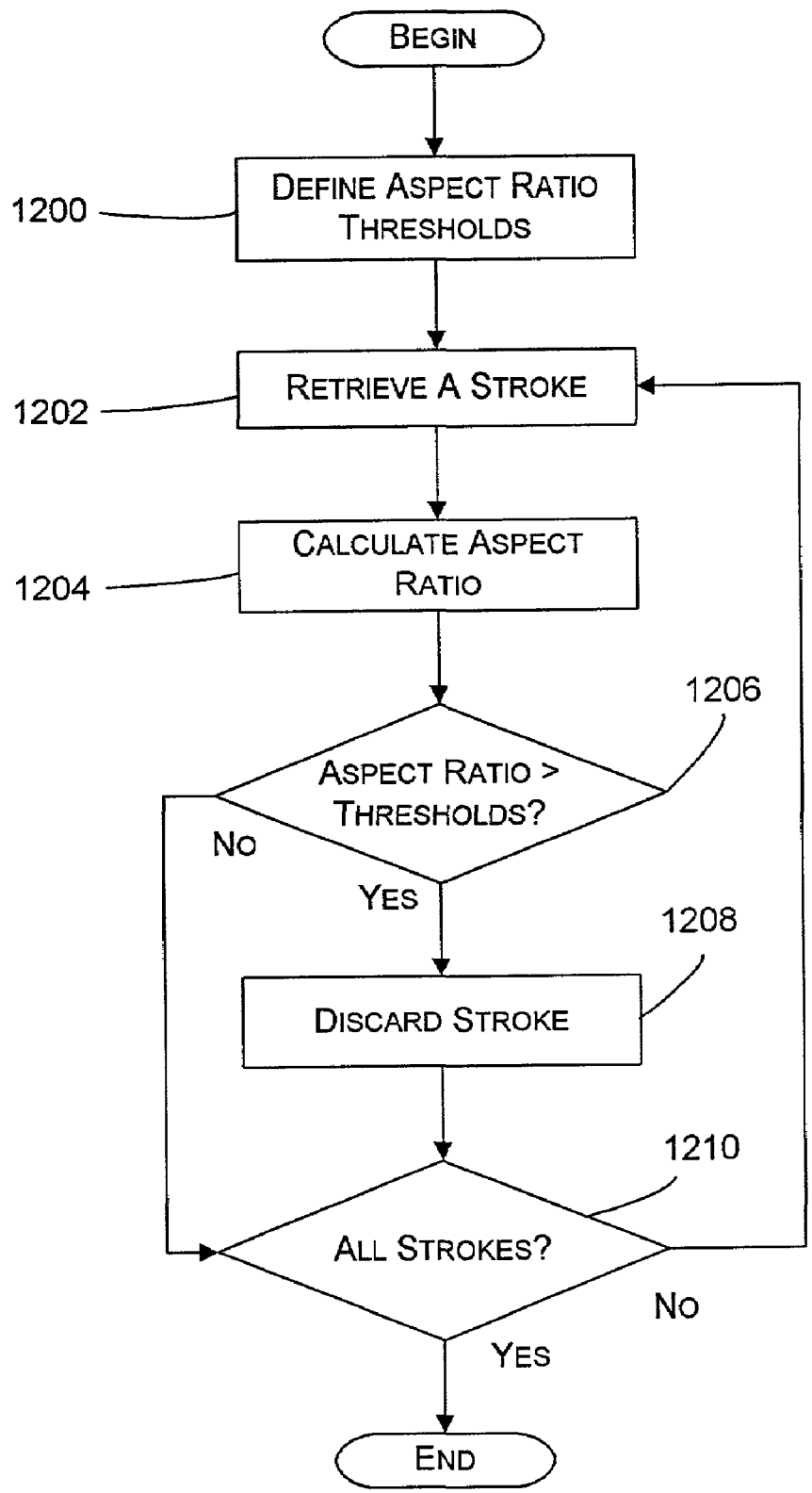
FIG. 12 shows a general overview of a process that may be used to evaluate grouped strokes locally in accordance with an aspect of the present invention.

An example of a general overview of a process that may be used by the local contextual analyzer 906 is shown in FIG. 12. Beginning at step 1200, the thresholds for the aspect ratios of strokes in a text group is determined. At step 1202, a stroke from a text group is retrieved, and at step 1204 the aspect ratio of the stroke is calculated. At step 1206, a determination is made as to whether the aspect ratio of the stroke falls outside the defined thresholds. If so, then the stroke is discarded from the stroke group in step 1208. A determination is then made at step 1210 whether all strokes have been evaluated. If so, the process ends. If not, then the process loops back to step 1202, where the next stroke in the text group is retrieved.

If the aspect ratio of the stroke does not exceed the defined thresholds, step 1206 branches directly to step 1210, where a determination is made whether all strokes have been evaluated.

The process used by the local contextual analyzer 906 improves the probability that all strokes within a given text group are text. This feature improves recognition or other processing after a text group has been classified as a text object.

It is possible that, after the local contextual analyzer 906 has performed its analysis, the strokes that were initially designated as text by the single stroke classification component 306 may be eliminated. In some circumstances, this may result in strokes that were grouped by the text spatial grouping component that do not have any text strokes remaining. If this situation occurs, the group of strokes is evaluated by the global contextual analyzer 908. This process may add strokes to the group, and may result in a designation as a text object.

Figure 13:
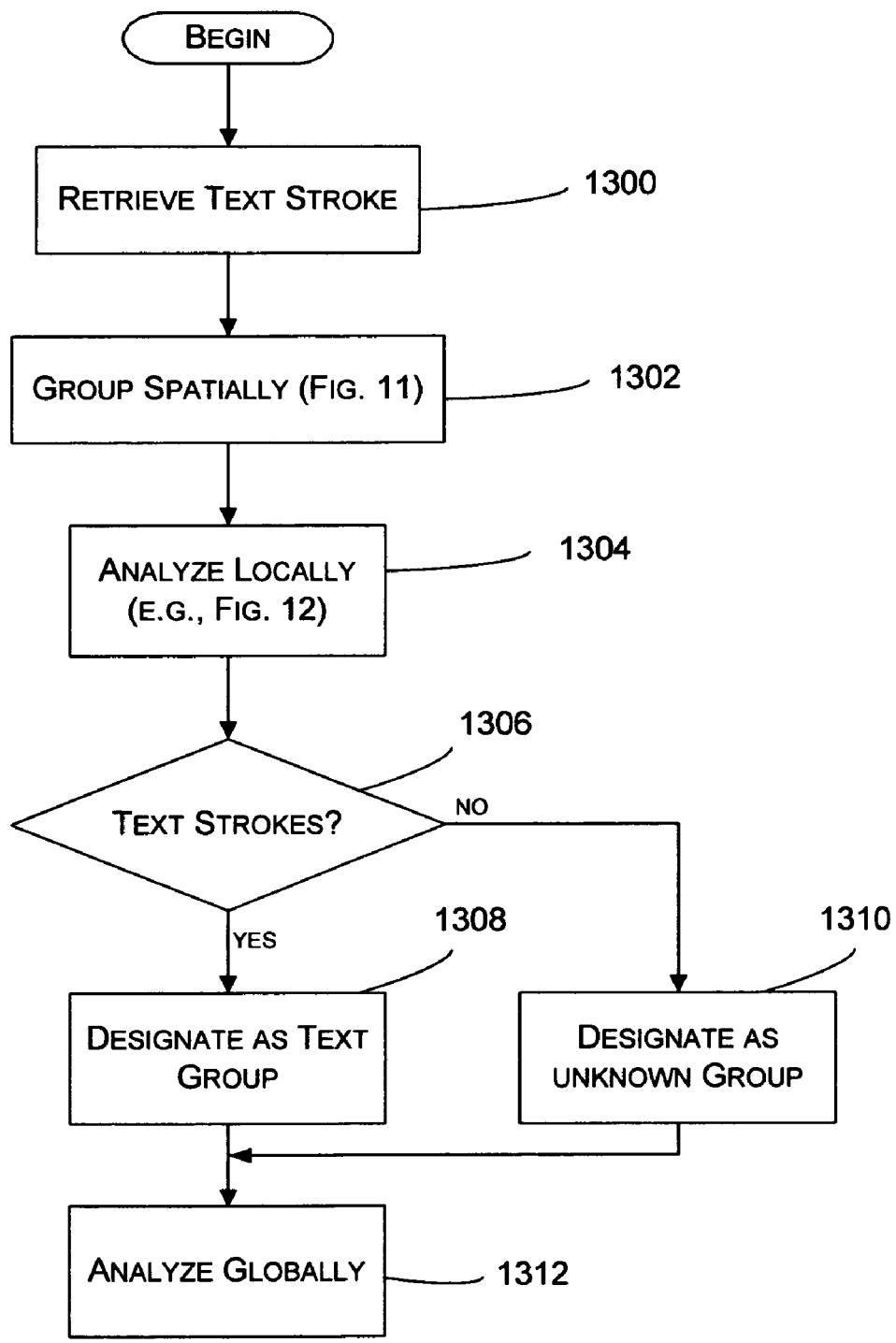
FIG. 13 shows a general overview of a process that may be used to evaluate grouped strokes globally in accordance with an aspect of the present invention.

A general overview of a process for this aspect of the present invention is shown in FIG. 13. Beginning at step 1300, a text stroke is retrieved (e.g., step 1100 described above). The text stroke is then grouped spatially at step 1302 (e.g., as described in connection with FIG. 11, above). A local contextual analysis is conducted at step 1304 (e.g., the local contextual analysis described in FIG. 12, above).

At step 1306, a determination is made whether any text strokes remain after the local contextual analysis. If so, step 1306 branches to step 1308, where the group of strokes is designated as text group. If not, then the group proceeds to step 1310, where it is designated as an unknown group. Whether the group is designated as text or unknown, the process then proceeds to global contextual analysis at step 1312, described below.

The process in FIG. 13 occurs because, after the text strokes are removed from the group, the assumption that the grouped strokes are text no longer exists. Thus, the process proceeds as if the group were unknown. This feature of the present invention assures that false positives (i.e., groups marked text that are not) are minimized.

Analyzing Context Globally

As described above, the global contextual analyzer 908 may globally evaluate the strokes in a stroke group to add strokes to the stroke group, or remove strokes from the stroke group. The process may result in an unknown group being designated as a text group. In addition, the process may result in strokes being added to a text group, so as to further assure that all relevant strokes are included in the text group. To this end, the global context analyzer 908 utilizes one or more features of strokes and defines a threshold for each of the features, or a combination of the features. The thresholds are established based upon features of the strokes in the digital ink file, including the strokes that are not in the text group being evaluated. Rules are established for some of the thresholds wherein a stroke that exceeds (or falls under, depending upon the threshold limit) the threshold is not considered to be text. In this manner, the global context analyzer 908 may eliminate one or more strokes in a stroke group that was combined by the text spatial grouping component 902. In addition, thresholds may be established whereby strokes not in a stroke group but falling within a threshold may be added to the stroke group by the global context analyzer 908. In this manner, the global context analyzer 908 may add some strokes to a stroke group, assuring that as many relevant strokes are included in a text group as possible, or causing an unknown group to be classified as text.

A number of different features may be used to help classify the strokes globally. As one example, a stroke may be eliminated for grouping because of the height of a stroke exceeds a threshold established for text strokes in the document. As one example, the average height of all known text strokes in the group (i.e., strokes designated as text by the single stroke classification component 306) may be calculated, and a threshold relative to that average may be set. For example, the following threshold may be set for a stroke to be considered as a text stroke:

$$h(ave)+threshold > h > h(ave)-threshold$$

where h is the height of a stroke, h(ave) is the average height of a text stroke in the document, and "threshold" is an allowed variance for the height of a text stroke. Other methods of normalization of the strokes may be used.

Thresholds may also be defined for adding a stroke to a group. For example, a distance may be defined in which a stroke is grouped with a stroke group if the stroke is within the defined distance from the stroke group, regardless of where the stroke falls in the sequence of strokes. This feature may be used, for example, to add the dot of an "i" to a text object, even though the dot does not fall within the threshold of the distance used by the text spatial grouping component 902. If desired, a stroke may only be added to the group if its length is below another threshold, preventing the addition of large strokes to an existing group, but allowing strokes that represent additions to text (e.g., the dot of an "i" or the cross of a "t") to be added. Adding a stroke to an unknown group may result in the group being classified as text, for example, if the added stroke is a known text stroke.

Figure 14:
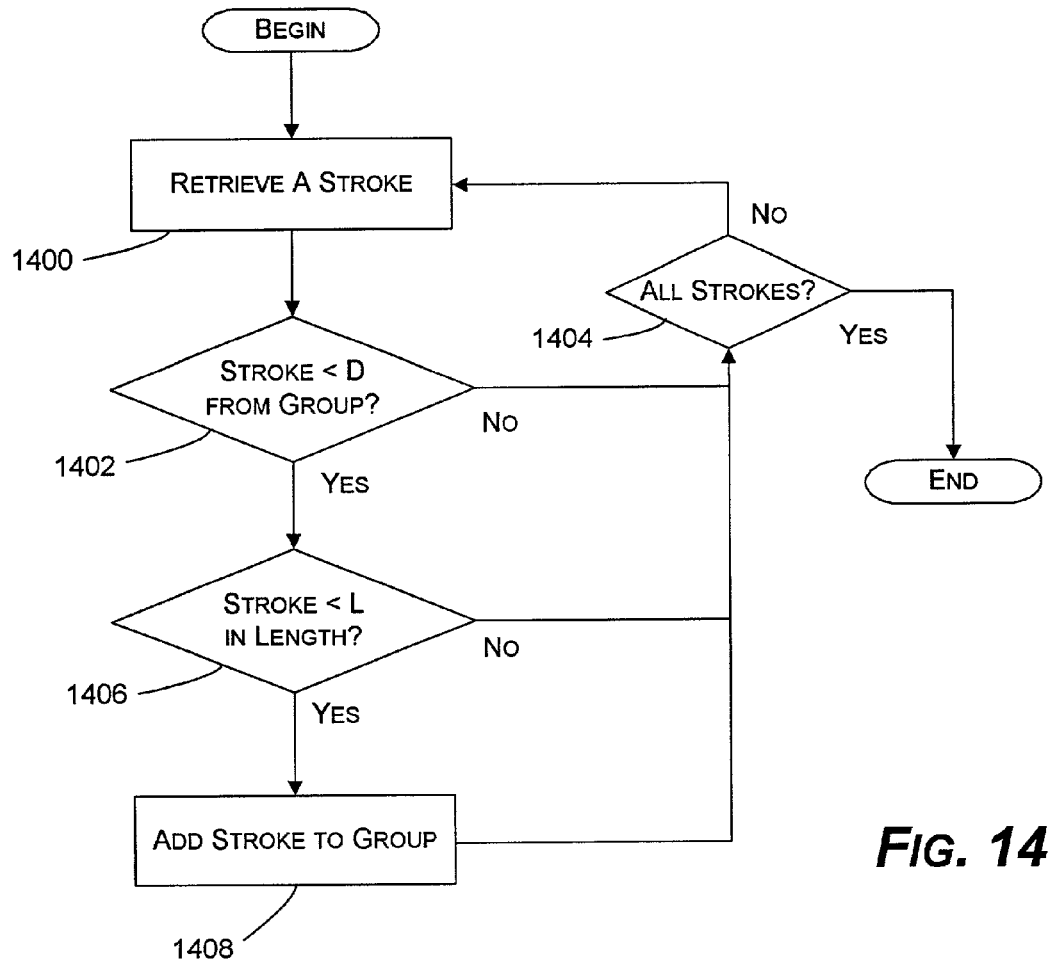
FIG. 14 shows a general overview of a process for evaluating whether a stroke should be added to a stroke group in accordance with one aspect of the present invention.

A general overview of a process for evaluating whether a stroke should be added to a stroke group in accordance with one aspect of the present invention is shown in FIG. 14. Beginning at step 1400, a stroke that is outside the group is retrieved. At step 1402, a determination is made whether the stroke is within a defined distance "D" from the stroke group. If not, the step 1402 branches to step 1404, where a determination is made whether all strokes have been evaluated. If so, the process ends. If not, the process loops back to step 1400, where the next stroke is retrieved.

If the stroke is within the defined distance from the stroke group, step 1402 branches to step 1406, where a determination is made whether the stroke is less than a defined length, "L." If not, step 1406 branches to step 1404, where a determination is made whether all strokes have been evaluated. If so, then step 1406 branches to step 1408, where the stroke is added to the stroke group. The process then proceeds to step 1404, where a determination is made whether all strokes have been evaluated.

The process used by the global contextual analyzer 908 improves the probability that all strokes within a given text group are text, and provides a manner in which strokes may be added to the text group after being formed by the local contextual analyzer 906. This feature improves recognition or other processing after a text group has been classified as a text object.

In addition, the process used by the global textual analyzer may result in an unknown group having strokes added, which may result in classification by the global textual analyzer of the new group as text (e.g., where the added strokes are known text strokes). Even if the additional strokes do not result in the group being classified as text, adding a stroke or strokes to the unknown group may result in improved classification by the grouped stroke classification component 910, described below.

Building the Grouped Stroke Classification Component

In accordance with one aspect of the present invention, the grouped stroke classification component 910 is configured to analyze a stroke group to determine whether it is a text object or an unknown stroke group. This process may be performed, for example, by choosing a feature of stroke groups, defining a threshold for the feature using statistics, and classifying using the threshold. As nonlimiting examples of features that may be used, a stroke group may be classified by its density, frequency, curvature, distribution, shape, image, texture, or aspect ratio.

In accordance with one aspect of the present invention, the grouped stroke classification component 910 is a trainable classifier, such as a neural network, a Bayesian network, or a support vector machine that is trained to classify grouped strokes as text or unknown based upon features of the grouped strokes. In one implementation of the present invention, the grouped stroke classification component 910 is a support vector machine that utilizes the feature of texture, in the form of an energy spectrum, to classify the grouped strokes.

Figure 15:
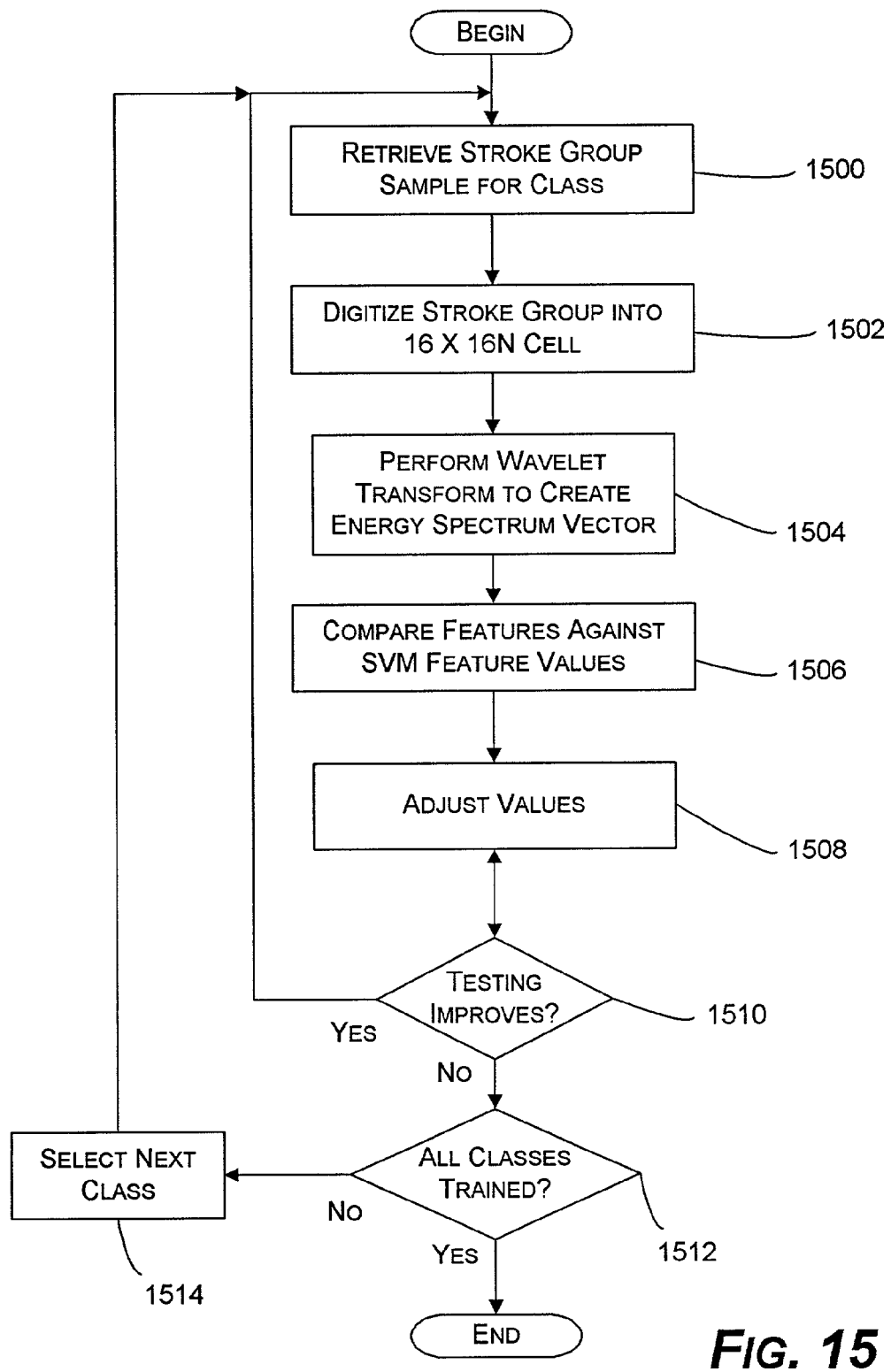
FIG. 15 is a general overview of a process for training a trainable classifier to recognize density features of stroke groups in accordance with one aspect of the present invention.

In accordance with one aspect of the present invention, a trainable classifier is trained to define hyperplanes for the density of known stroke group values. To this end, FIG. 15 is a general overview of a process for training the trainable classifier to recognize the density features of stroke groups in accordance with one aspect of the present invention. For ease of reference, the trainable classifier is referred to hereinafter as a support vector machine, although other trainable classifiers may be used. In this example, the objects that are to be in a class are stroke groups that fall within a margin of error of meeting the energy spectrum features of a trained stroke group class. The different energy spectrum features are defined by an energy spectrum vector, which may be created using a wavelet transform, as described further below.

Beginning at step 1500, the support vector machine retrieves a known stroke group sample for a given class. The class may be, for example, a known stroke or stroke group for a letter, a group of letters, or a character. The stroke group sample may be one of hundreds for the particular class that have been generated by separate individuals.

Information about the energy spectrum of the stroke group is then generated. To evaluate the energy spectrum of the stoke groups, in accordance with one aspect of the present invention, the grouped stroke classification component 910 utilizes an energy spectrum vector generated for the grouped strokes by a Harr wavelet transform. A wavelet transform is a method of converting a signal into a series of wavelets, for example for efficient storage. One of its computing applications is in lossy compression for color graphics. An example of a Harr wavelet transform that may be used by the present invention is disclosed in Sun et al., "Fast Wavelet Transform for Color Image Compression," Image Processing, 1996. Proceedings, International Conference Volume 1, pages 541-544.

To prepare a stroke group for the Harr wavelet transform, the stroke group is digitized into a 16×16N cell at step 1502, where "N" is the aspect ratio of the group. The Harr wavelet transform is then performed on the digitized cell to create an energy spectrum vector at step 1504, which represents the density of the stroke group.

At step 1506, the features of the energy spectrum vector are compared by the support vector machine against possible energy spectrum features for stroke groups. This information is used to train the support vector machine to generate a trained energy spectrum vector for the present stroke group class.

As the training inputs are fed to the support vector machine, the values of the weights and biases for particular features are adjusted (e.g., in accordance with a known back-propagation technique) such that the output of the support vector machine of each individual training pattern approaches or matches the known output (step 1508). At step 1510, a determination is made if the system's performance on the validation set no longer improves. If not, the process loops back to step 1500, where the next stroke group for the class is obtained. If so, the process for that stroke group ends, and a determination is made at step 1512 whether all classes (e.g., words, letters, characters, strings of words, or the like) have been trained. If not, the next stroke group class begins training at step 1514. If so, the process ends.

After all stroke group classes have been trained, the support vector machine is ready for use with the invention. It can be understood that the number of class samples may be large, and thus training the support vector machine may be a time-consuming and expensive process, requiring thousands of stroke samples from hundreds of individuals. However, once trained, the support vector machine of the present invention may be duplicated and used in the grouped stroke classification component 910 for multiple applications.

Classifying Strokes

In accordance with one aspect of the present invention, after trained, the grouped stroke classification component 910 may be used to classify some a stroke group as a text object or an unknown stroke group. This process is very similar to the process used to classify single strokes, described above, in that a trained support vector machine is used. However, for grouped stroke classification, the features that are input are an energy spectrum of a group, as opposed to the curvature features entered for the single stroke classification.

Figure 16:
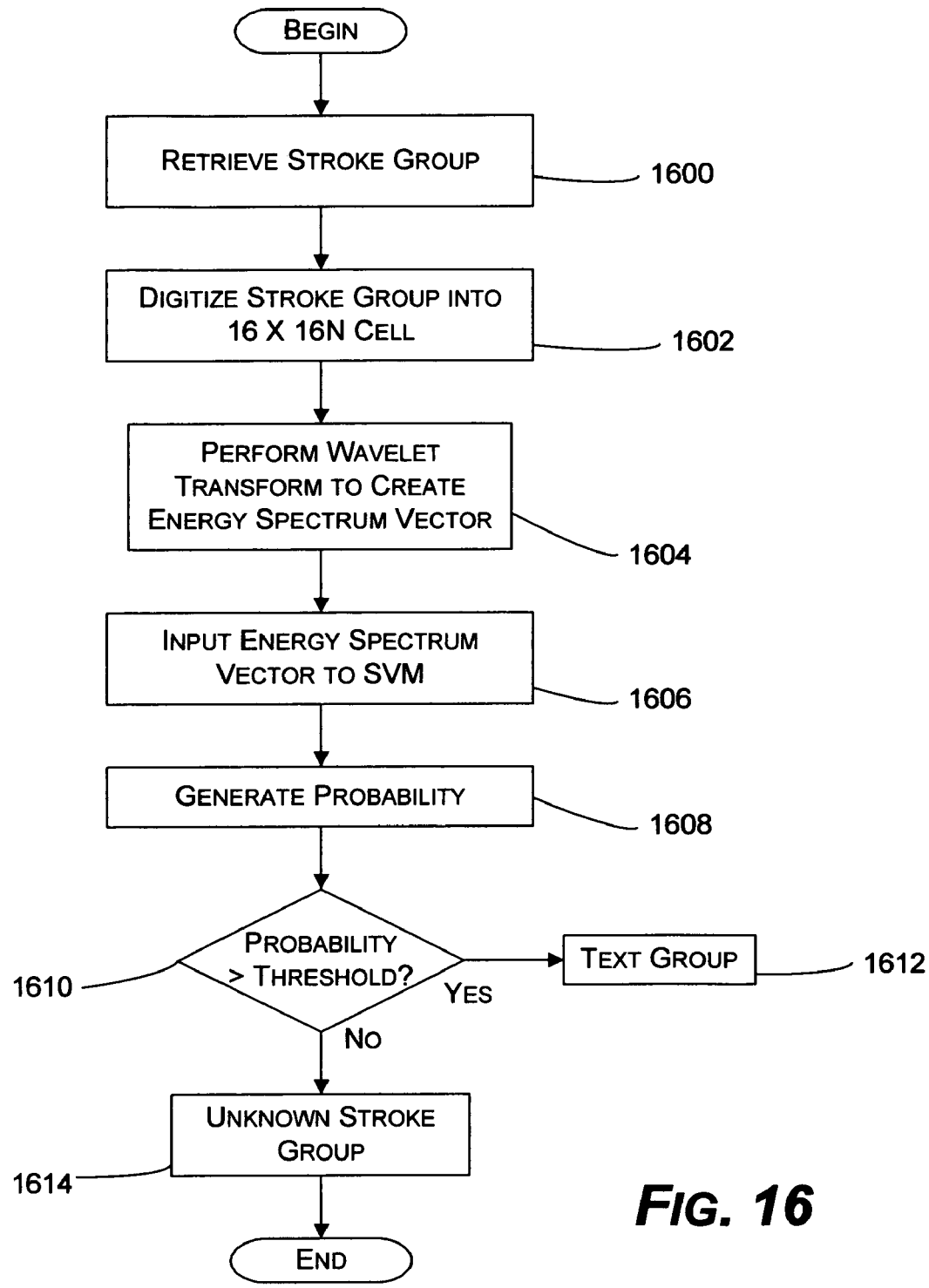
FIG. 16 shows a general overview of a process for classifying a stroke group as a text object or an unknown stroke group in accordance with one aspect of the present invention.

FIG. 16 shows a general overview of a process for classifying a stroke group as a text object or an unknown stroke group in accordance with one aspect of the present invention. Beginning at step 1600, an unknown stroke group is retrieved. At step 1602, the stroke group is digitized into a 16×16N cell.

At step 1604, a wavelet transform is performed on the 16×16N digitized cell, forming an energy spectrum vector. The energy spectrum vector is applied as input to the support vector machine (SVM) classifier of the grouped stroke classification component 910 in step 1606. Based on the features that are present in the energy spectrum vector, the support vector machine generates a probabilistic measure as to whether the stroke group is one of the trained stroke groups in the support vector machine or not (step 1608). This measure is then compared against a preset threshold value (step 1610).

If the probabilistic measure for the stroke is greater than the threshold, then step 1610 branches to step 1612, where the stroke group is classified as a text group. Otherwise, step 1610 branches to step 1614, where the stroke group is classified as an unknown stroke group.

The grouped stroke classification process described herein results in a stroke group being classified as a text group or an unknown group. The classified stroke groups may then be further analyzed by the global contextual analyzer 908, as described above, or may be processed or maintained in the database 308 for later analysis or use.

The present invention utilizes several different methods of classifying strokes or groups of strokes as text groups. After performing one or more of the processes of the present invention, a digital file may be processed more efficiently.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer readable medium having computer-executable instructions, comprising, accessing a plurality of stroke samples, the stroke samples representing more than one class, wherein at least on class represented is a text class and at least one class represented is a drawing class;

extracting curvature features of each of the strokes for each class; and using the curvature features, training a support vector machine to classify strokes for each class, wherein the curvature features of a stroke comprise a discrete curvature stroke, the discrete curvature being defined using a difference between angles determined in accordance with points along the stroke.

2. The computer readable medium of claim 1, wherein the curvature features of a stroke comprise a tangent histogram of the stroke.

3. The computer readable medium of claim 1, further comprising grouping some of the strokes of the plurality of strokes based upon a relative height threshold of the plurality of strokes.

4. The computer readable medium of claim 1, further comprising grouping some of the strokes of the plurality of strokes based upon a relative aspect ratio of the plurality of strokes.

5. A computer readable medium having computer-executable instructions, comprising:
   accessing a digital ink file having at least one stroke therein;
   extracting curvature features of the at least one stroke;
   based upon an analysis of the curvature features, determining whether the at least one stroke is text by evaluating the stroke with a support vector machine; and
   based upon the curvature features, determining whether the at least one stroke is classified as an unknown stroke.

6. The computer readable medium of claim 5, wherein the curvature features comprise the discrete curvature of the stroke.

7. The computer readable medium of claim 5, further comprising:
   accessing a plurality of strokes in the digital ink file, and
   grouping some of the strokes of the plurality of strokes based upon local characteristics of the plurality of strokes to form grouped strokes.

8. The computer readable medium of claim 7, wherein the grouped strokes are grouped based upon spatial information regarding the plurality of strokes.

9. The computer readable medium of claim 8, wherein the spatial information comprises a distance threshold between strokes in the subset of the plurality of strokes.

10. The computer readable medium of claim 7, wherein the grouped strokes are grouped based upon a relative height threshold of the strokes.

11. The computer readable medium of claim 7, wherein the grouped strokes are grouped based upon a relative aspect ratio of the strokes.

12. The computer readable medium of claim 7, wherein the grouped strokes are grouped based upon a normalized height of at least some of the plurality of strokes.

13. The computer readable medium of claim 7, wherein the grouped strokes are grouped based upon a threshold distance between the strokes.

14. A computer readable medium having computer-executable instructions, comprising:
   accessing a digital ink file having at least one stroke therein;
   extracting the tangent histogram of the at least one stroke;
   based upon an analysis of the the tangent histogram, determining whether the at least one stroke is text; and
   based upon the the tangent histogram, determining whether the at least one stroke is classified as an unknown stroke.

* * * * *